US009451493B2

United States Patent
Li et al.

(10) Patent No.: US 9,451,493 B2
(45) Date of Patent: Sep. 20, 2016

(54) DRIVE TEST MINIMIZATION METHOD AND DEVICE FOR OBTAINING TIME DELAY

(71) Applicant: ZTE CORPORATION, Shenzhen, Guangdong Province (CN)

(72) Inventors: Dapeng Li, Shenzhen (CN); Lifeng Han, Shenzhen (CN); Zijiang Ma, Shenzhen (CN); He Huang, Shenzhen (CN); Jianmin Fang, Shenzhen (CN); Feng He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 110 days.

(21) Appl. No.: 14/388,850

(22) PCT Filed: Mar. 27, 2013

(86) PCT No.: PCT/CN2013/073255
§ 371 (c)(1),
(2) Date: Sep. 29, 2014

(87) PCT Pub. No.: WO2013/143458
PCT Pub. Date: Oct. 3, 2013

(65) Prior Publication Data
US 2015/0092579 A1   Apr. 2, 2015

(30) Foreign Application Priority Data

Mar. 28, 2012 (CN) .......................... 2012 1 0085774

(51) Int. Cl.
H04L 12/28 (2006.01)
H04W 24/10 (2009.01)
H04L 12/26 (2006.01)

(52) U.S. Cl.
CPC .......... *H04W 24/10* (2013.01); *H04L 43/0852* (2013.01)

(58) Field of Classification Search
CPC ... H04L 12/26; H04L 12/2602; H04L 43/00; H04L 43/08; H04L 43/0852; H04W 24/02; H04W 24/08; H04W 24/10
USPC ........ 370/229–240, 252, 389–394, 412–420; 709/223–226, 230–244
See application file for complete search history.

(56) References Cited

U.S. PATENT DOCUMENTS 8,983,392 B2 * 3/2015 Ren ...................... H04W 24/10
455/423
9,282,562 B2 * 3/2016 Chou .................... H04W 24/02
(Continued)

FOREIGN PATENT DOCUMENTS

CN  101931981 A  12/2010
CN  102355692 A   2/2012
(Continued)

OTHER PUBLICATIONS

Measurement Types for QoS Verification; CATT; 3GPP TSG RAN WG2 Meeting #76; San Francisco, USA Nov. 14-18, 2011. R2-116020.
(Continued)

*Primary Examiner* — Tri H Phan
(74) *Attorney, Agent, or Firm* — Ling Wu; Stephen Yang; Ling and Yang Intellectual Property

(57) ABSTRACT

A method, device and system for controlling assistant information of user equipment are disclosed. The field of wireless communication technology is related, and the problem is solved that the system efficiency is reduced, for UE reports the assistant information inappropriately. The method includes: the user equipment acquiring a control parameter of assistant information configured by a network side; and the user equipment reporting the assistant information of the user equipment to the network side according to the control parameter of assistant information. The technical scheme provided in the example of the present document is applied to a LTE system or a UMTS system, which implements that the network side controls the UE reporting the assistant information.

14 Claims, 1 Drawing Sheet

(56) References Cited

U.S. PATENT DOCUMENTS

| | | | |
|---|---|---|---|
| 2006/0268713 A1* | 11/2006 | Lundstrom | H04L 47/10 370/235 |
| 2011/0128856 A1* | 6/2011 | Won | H04L 41/5019 370/237 |
| 2011/0292797 A1* | 12/2011 | Bejerano | H04L 12/66 370/230.1 |
| 2012/0088457 A1* | 4/2012 | Johansson | H04W 24/10 455/67.11 |
| 2013/0028127 A1* | 1/2013 | Zheng | H04L 43/0852 370/252 |
| 2013/0114408 A1* | 5/2013 | Sastry | H04W 28/02 370/231 |
| 2013/0182624 A1* | 7/2013 | Sun | H04W 52/0212 370/311 |
| 2013/0201851 A1* | 8/2013 | Chou | H04W 24/02 370/252 |
| 2014/0113656 A1* | 4/2014 | Schmidt | H04W 24/10 455/456.2 |
| 2014/0204739 A1* | 7/2014 | Szymanski | H04L 47/56 370/230 |

FOREIGN PATENT DOCUMENTS

| | | | | |
|---|---|---|---|---|
| CN | EP 2615863 A1 * | 7/2013 | | H04W 24/10 |
| WO | WO2011147339 A1 | 12/2011 | | |

OTHER PUBLICATIONS

Measurements for MDT QoS Verification; Ericsson, ST-Ericsson; 3GPP TSG-RAN- WG2#77; Dresden, Germany, Feb. 6-10, 2012. R2-120506.

Possible Measurement Types for MDT QoS Verification; 3GPP TSG RAN WG2 Meeting#77, Dresden, Germany, Feb. 6-10, 2012. R2-120772.

Definition of delay sensitive QoS experience measurement; Ericsson, ST-Ericsson; 3GPP TSG-RAN- WG2#77bis; Jeju, Korea, Mar. 26-30, 2012. Tdoc R2-121601.

* cited by examiner

DRIVE TEST MINIMIZATION METHOD AND DEVICE FOR OBTAINING TIME DELAY

TECHNICAL FIELD

The present document relates to the field of communications, and more particularly, to a minimization of drive test method and device for obtaining a time delay.

BACKGROUND OF THE INVENTION

In order to reduce the cost and complexity of the operators using special devices to perform the manual drive test, the Third Generation Partnership Projects (referred to as 3GPP) began to introduce the Minimization of Drive Test (referred to as MDT) function in the Release-10 of the Universal Terrestrial Radio Access Network (referred to as UTRAN) including the Node B and the Radio Network Controller (RNC), and the Evolved Universal Terrestrial Radio Access Network (referred to as E-UTRAN) system including the evolved NodeB (eNB). The core network (referred to as CN) corresponding to the UTRAN comprises a Home Subscriber Server (referred to as HSS), a Mobile Switching Centre Server (referred to as MSC Server), and a Serving General Packet Radio Service Support Node (referred to as SGSN) and so on. The core network (CN) corresponding to the E-UTRAN comprises a HSS, a Mobile Management Entity (referred to as MME), and so on. The minimization of drive test function uses the user equipment (referred to as UE) to automatically collect and report the measurement information to the radio access network (referred to as RAN) through the control plane signaling, wherein, it refers to the RNC in the UTRAN system and the eNB in the E-UTRAN system, and then the information is reported to the Trace Collection Entity (referred to as TCE) in the Operation And Maintenance (referred to as OAM) system through the radio access network, and used for network optimization, for example: finding out and solving the network coverage problem.

The MDT function can be divided into management-based MDT and signaling based MDT. The process of activating the management-based MDT is usually (take the E-UTRAN system as an example, which is the same in the following) that the OAM (operation and maintenance or called Network Management System) sends the eNB a Trace session activation message containing the MDT configuration, and the eNB selects an appropriate UE within the area specified by the message and sends the MDT configuration information to the selected UE. The process of activating the signaling based MDT is that the OAM sends a Trace session activation message including the MDT configuration to the home subscriber server (referred to as HSS) to activate the MDT measurement of the specified UE, the HSS sends the MDT configuration information of the UE to the MME, and the MME sends the MDT configuration information of the UE to the eNB, and the eNB eventually sends the MDT configuration information to the UE. The signaling based MDT usually uses the international mobile subscriber identity (referred to as IMSI) or the International Mobile Station Equipment Identity (referred to as IMEI) to specify a UE, or together with the area information, to restrict the selection of UE. The management based MDT and the signaling based trace session activation message comprise the trace reference information from the OAM, wherein, the information comprises the public land mobile network (referred to as PLMN) information and is composed of the Mobile Country Code (referred to as MCC) and the Mobile Network Code (referred to as MNC).

The MDT function can be divided into two working modes, specifically "logged MDT" and "immediate MDT", in accordance with whether it works in the idle state or the connected state. The logged MDT refers to that the UE is in the radio resource control idle state (refer to the RRC_IDLE state for the E-UTRAN system, further comprising the cell_paging channel state (CELL_PCH) and the UTRAN Registration Area_Paging Channel state (URA_PCH) for the UTRAN system). When the configured conditions are met, the related measurement information is collected and stored, and used to be reported when receiving a command requirement from the radio access network (RAN) in future, and after the radio access network (RAN) receives the data, it collects or directly forwards the data to the TCE. The immediate MDT refers to that the UE collects the related measurement information when the UE is in the RRC connection state (refer to the RRC_CONNECTED state for the E-UTRAN system; and for the UTRAN system, refer to the cell_dedicated channel state (CELL_DCH)), and actively reports the related measurement information to the radio access network (RAN) when the reporting conditions are met, after the radio access network (RAN) receives the report, it collects or directly sends the report to the TCE.

The objective of the MDT measurement is to provide data for analyzing the network performance. The MDT measurement is used to find out the key link that affects the network performance, finding out whether it is necessary to adjust the network configuration parameter or the network capacity extension or not. In the early deployment or the large-scale use of the network, this function can be used to detect whether the Quality of experience (QoE) of the UE meets the network planning requirements or not. The existing manual drive test also has the measurement work, but the cost of the manual drive test is relatively high, and some specific areas are unable to be fully measured with the manual drive test. Therefore, the MDT measurement uses a plurality of UEs to report the practically measured data when using the service, so as to provide the statistically significant measurement data for the operators.

The Quality of Service (QoS) in the related art is used to indicate the actual transmission conditions of a service, and there are a total of nine different QoS, indicated with QCI (QoS Class Identifier), and each QCI has a specified attribute value such as the packet delay budget (PDB), Packet Error Loss Rate (PELR), priority, and so on. In the related art, each terminal can have a plurality of radio access bearers, and each radio access bearer corresponds to one radio bearer, and each radio access bearer has one corresponding QCI, that is, each radio bearer has one corresponding QCI, for example in the E-UTRAN system, the evolved radio access bearer (E-RAB) and the radio bearer (RB) have and only have the same QCI.

However, the related art does not have MDT measurement for time delay.

SUMMARY OF THE INVENTION

The embodiment of the present document provides a minimization of drive test method and device for obtaining a time delay, to solve the problem that there is no minimization of drive test method in the related art to directly reflect the delay problem.

A minimization of drive test method for obtaining a time delay provided in an embodiment of the present document, comprises:

a node receiving a minimization of drive test (MDT) measurement and configuration parameter, wherein, the MDT measurement and configuration parameter carries a measurement requirement for obtaining a delay;

the node performing statistics on data information related to the total number of packets and the number of packets whose transmission time exceeds a packet delay budget (PDB) of an air interface within measurement time.

Preferably, after the node performs statistics on the data information, the method further comprises, the node reporting the data information to a trace collection entity (TCE).

Preferably, the node comprises an access network device and/or a terminal.

Preferably, the PDB of the air interface is a PDB of a QoS Class Identifier (QCI) of service under test minus x, wherein x is in a range of [0,300] milliseconds.

Preferably, the x is 20 milliseconds.

Preferably, the measurement time comprises: the total transmission time of a radio bearer (RB), or part of the transmission time of the radio bearer.

Preferably, the data information related to the total number of packets and the number of packets whose transmission time exceeds the PDB of the air interface comprises:

the total number of packets and the number of packets whose transmission time exceeds the PDB of the air interface; or a ratio of the number of packets whose transmission time exceeds the PDB of the air interface to the total number of packets; or the number of packets whose transmission time exceeds the PDB of the air interface, as well as the ratio of the number of packets whose transmission time exceeds the PDB of the air interface to the total number of packets.

A minimization of drive test device for obtaining a time delay provided in an embodiment of the present document, comprises a receiving module and a statistical module, wherein:

the receiving module is configured to receive a MDT measurement and configuration parameter, wherein the MDT measurement and configuration parameter carries a measurement requirement for obtaining a delay;

the statistical module is configured to perform statistics on data information related to the total number of packets and the number of packets whose transmission time exceeds a packet delay budget (PDB) of an air interface within measurement time.

Preferably, the device further comprises a reporting module which is configured to report the data information on which the statistical module performs statistics to a trace collection entity (TCE).

Preferably, the device is an access network device and/or a terminal.

The method in accordance with the embodiments of the present document directly perform statistics on the number of abnormal packets (that is, the number of packets which exceed the packet delay budget) and the total number of packets, and directly reflects the delay issue through data, and the operators can find out the nodes with serious delays in accordance with the number of abnormal packets. The method in accordance with the embodiments of the present document can be used to achieve the effect of enhancing the network performance and avoiding the waste of network resources. The method in accordance with the embodiments of the present document can support the uplink and/or downlink measurements, so as to meet the actual needs of the MDT.

The present document is applicable to the E-UTRAN and UTRAN systems, to the management based MDT and the signaling based MDT, and to the immediate MDT.

BRIEF DESCRIPTION OF THE DRAWINGS

The accompanying drawings described herein are used to provide a further understanding of the present document and constitute a part of the present application, and the exemplary embodiments of the present document and their description are used to explain the present document and do not constitute an unduly limit of the present document. In the accompanying drawings.

PREFERRED EMBODIMENTS OF THE PRESENT DOCUMENT

Figure 1:
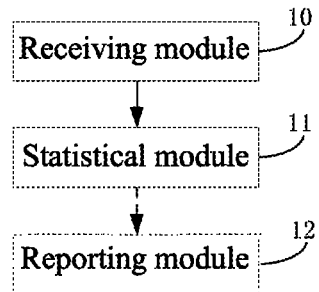
FIG. 1 is a schematic diagram of the structure of a minimization of drive test device for obtaining a time delay.

The minimization of drive test method provided in the present embodiment comprises: a node receiving a MDT measurement and configuration parameter, wherein, the MDT measurement and configuration parameter carries a measurement requirement for obtaining a delay, and the node performs statistics on data information related to the total number of packets and the number of packets whose transmission time exceeds the packet delay budget of the air interface in measurement time.

The abovementioned node can be an access network device such as eNB or RNC, and it can also be a terminal device such as UE, or comprises both the access network device and the terminal.

After the measurement is completed, the node reports the obtained data information through statistics to the TCE.

The air interface refers to the interface between the terminal and the access network device, namely the interface between the UE and the eNB, or the interface between the UE and the RNC.

The time delay of the air interface refers to the time delay of radio bearer (RB), that is, the time delay that the packet is sent from one side of the air interface and successfully received by the other side of the air interface, and the packet is a PDCP (Packet Data Convergence Protocol) packet; the successfully reception can be that the last HARQ transmission (hybrid automatic repeat request) of the PDCP packet transmission is successful or the entire PDCP packet is accepted by the peer PDCP layer, which will not affect the accuracy of the result of this method.

The packet delay budget of the air interface refers to the most reasonable transmission time of packets during the process of transmitting over the air interface. The packet delay budget of the air interface can be explicitly configured or calculated and obtained by the node according to the QoS parameter which the radio bearer belongs to, and the method for calculating the packet delay budget can be the one in the related art. Preferably, the packet delay budget of the air interface=the PDB of the QCI of the service under test-x, wherein x is in the range of [0,300] ms, preferably x=20 ms (milliseconds).

The number of packets whose transmission time exceeds the packet delay budget of the air interface and the total number of packets are required to be obtained in the same time interval, and the time interval is the measurement time, such as the total transmission time of radio bearer (RB), or a part of the transmission time of the radio bearer, and the transmission time can be the total transmission time by default or explicitly configured as a part of the transmission time.

The data information related to the total number of packets and the number of packets whose transmission time exceeds the packet delay budget of the air interface comprises the following three cases: 1, the total number of packets and the number of packets whose transmission time exceeds the packet delay budget of the air interface; 2, a ratio of the number of packets whose transmission time exceeds the packet delay budget of the air interface to the total number of packets, that is, the ratio of the number of packets whose transmission time exceeds the packet delay budget in the total number of packets; 3, the number of packets whose transmission time exceeds the packet delay budget of the air interface, as well as the ratio of the number of packets whose transmission time exceeds the packet delay budget of the air interface to the total number of packets.

A device for implementing the abovementioned method is shown in FIG. 1, and it comprises receiving module 10 and statistical module 11, wherein:

the receiving module 10 is configured to receive the MDT measurement and configuration parameter, and the MDT measurement and configuration parameter carries the measurement requirement for obtaining the delay;

the statistical module 11 is configured to perform statistics on the data information related to the total number of packets and the number of packets whose transmission time exceeds the packet delay budget of the air interface in the measurement time.

Preferably, the abovementioned device further comprises reporting module 12, which is configured to report the data information on which the statistical module performs statistics to the TCE. The device may be an access network device and/or a terminal.

It should be noted that, in the case of no conflict, the embodiments of present application and features in the embodiments may be combined with each other. In the following, in combination with the signaling based and management based, as well as immediate MDT based, or the management based MDT, the process of the abovementioned embodiment will be described in further detail.

The First Embodiment

The present embodiment is used to illustrate how the Node B implements the MDT measurement of time delay in the immediate MDT of the signaling based MDT.

Figure 2:
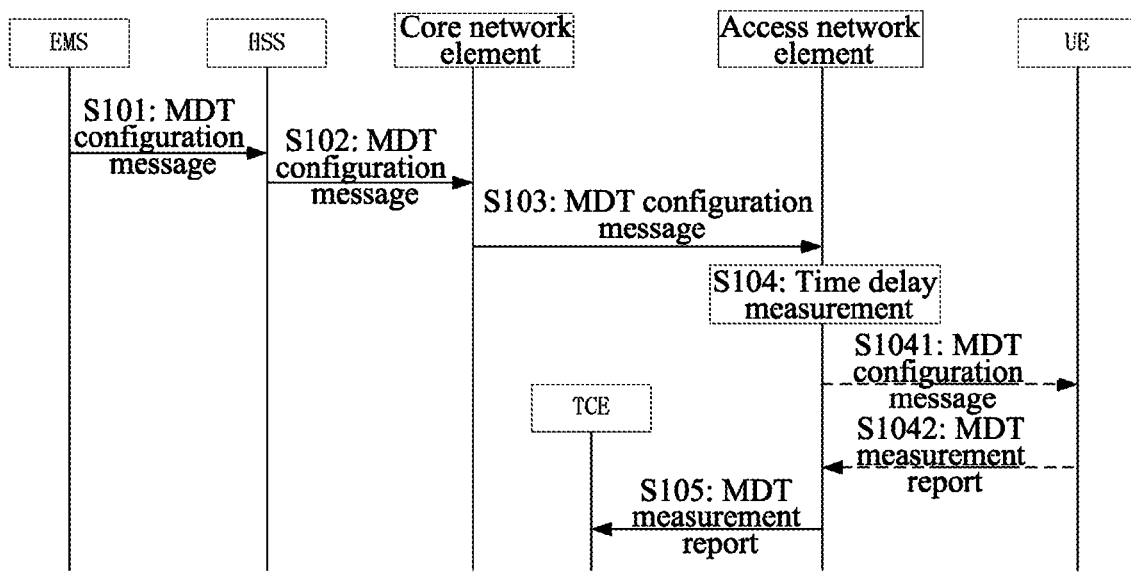
FIG. 2 is a flow chart of a first embodiment of the present document.

FIG. 2 is a flow chart of the MDT method in the case of the signaling based MDT and in the working mode that the MDT function is in the immediate MDT. As shown in FIG. 2, the method may comprise the following processing steps:

step S101: the Network Management System (NMS) triggers the minimization of drive test, sends a minimization of drive test configuration message such as a Trace Session Activation message to the network element of home subscriber server (HSS), wherein the message comprises the measurement requirement which triggers to obtain the delay;

step S102: after the home subscriber server (HSS) retrieves that the UE enters into an attachment state, it sends a minimization configuration message to the core network element where the UE is located;

if it is in the case of E-UTRAN network, the core network element is MME; if it is in the case of UTRAN network, the core network element is a SGSN or MSC server; for example: when the core network element is a MME, the message carrying the MDT configuration is the Update location answer message, wherein, the message comprises a measurement requirement which triggers to acquire the delay;

Step S103: the core network element sends a minimization of drive test configuration message to the access network element;

if it is in the case of E-UTRAN network, the access network element is eNB, and the messages carrying the minimization of drive test configuration is the Initial context setup request message; if it is in the UTRAN PS domain, the access network element is a RNC, and the message carrying the minimization of drive test configuration is the core network invoke Trace message; the message comprises the measurement requirement that triggers to acquire the location information; or the core network element sends a special message which includes the measurement requirement for acquiring the delay;

step S104: the access network element accepts the minimization of drive test configuration message, and starts to perform statistics on the number of packets whose transmission time exceeds the packet delay budget of the air interface and the total number of packets;

after the access network accepts the MDT configuration, it identifies that it comprises the measurement requirement for acquiring the delay, then starts to perform statistics on the number of packets whose transmission time exceeds the packet delay budget of the air interface and the total number of packets;

if the configuration and measurement object is all the services of the terminal, the measurement object is all the services of the radio bearer of the terminal within the measurement time;

if the configuration and measurement object is a specific service of the terminal, for example, it is explicitly or by default to measure services, such as a certain QCI/E-RAB and so on, in the configuration, then the measurement object is the service of the radio bearer corresponding to the QCI/E-RAB of the terminal within the measurement time;

In the following, examples are used for illustration:

if individually measuring a specific downlink QCI service, such as a voice service whose QCI is 1, the Node B acquires that the maximum end-to-end time delay of the QCI is 100 ms according to the related art, and according to this method, the Node B calculates that the packet delay budget of the air interface is 100 ms minus 20 ms, which is 80 ms, and the Node B performs statistics on the total number of packets that are sent from the Node B and successfully accepted by the terminal and the number of packets whose transmission time exceeds 80 ms, and the criteria for judging whether the packets are successfully accepted or not can be the same as the criteria in the related art, for example, it can be that the last HARQ transmission of the PDCP packet transmission is successful or the entire PDCP packet is accepted by the peer PDCP layer, neither of which will affect the accuracy of the result. For example, the total number of the counted packets can be 10,000, and the number of packets whose transmission time exceeds 80 milliseconds is 300.

if individually measuring a specific uplink QCI service, such as a TCP service whose QCI is 6, the Node B acquires that the maximum end-to-end time delay of the QCI is 300 ms according to the related art, and according to the present method, the Node B calculates that the packet delay budget of the air interface is 300 ms minus 20 ms, which is 280 ms, and the Node B performs statistics on the total number of packets that are sent from the terminal and successfully accepted by the Node B and the number of packets whose transmission time exceeds 80 milliseconds, and the criteria for judging whether the packets are successfully accepted or not can be the same as the criteria in the related art, for example, it can be from the final time of the last packet to the time that the last HARQ transmission of the next PDCP packet is successfully accepted, which will not affect the accuracy of the result of the present document. For example, the total number of counted packets can be 10,000, and the number of packets whose transmission time exceeds 280 ms is 300.

The Node B can simultaneously start both the uplink and downlink measurements, or carry out only the uplink or downlink measurement.

The MDT measurement for time delay can be carried out simultaneously with the MDT measurement in the related art. If the Node B needs the terminal to provide this measurement with supplementary information, for example, the Node B needs the terminal to provide the location information, the Node B can continue to send the MDT configuration to the terminal, and the information message configured by the Node B for the terminal adopts the same message related to the radio resource management and measurement; after the UE accepts the configuration, it carries out the measurement and reporting (see S1041 and S1042 in the accompanying drawings); this example is the immediate minimization of drive test, and the UE performs the measurement and reporting according to the period and the number of times instructed in the configuration, or triggers reporting according to the event.

Step S105: the Node B reports the MDT measurement result.

The Node B reports the result to the TCE (Trace Collection Entity);

the Node B reports to the node the total number of packets and the number of packets whose transmission time exceeds the packet delay budget of the air interface, or the ratio of the number of packets whose transmission time exceeds the packet delay budget of the air interface to the total number of packets, or the number of packets whose transmission time exceeds the packet delay budgets of the air interface as well as the ratio of the number of packets whose transmission time exceeds the packet delay budgets of the air interface to the total number of packets, for example, if the total number of packets counted in the uplink is 10,000, the number of packets whose transmission time exceeds 80 milliseconds is 300, then the Node B reports (10000,300), 3%, or (10000,3%) to the TCE.

The Node B may choose to report according to its own measurement condition, or report after combining with the report of the terminal, for example, after the terminal provides the location information, the Node B combines and reports its measured time delay content and the location information of terminal, for example, reporting (10000,300, location information (latitude and longitude, and so on)) to the TCE.

The Second Embodiment

This embodiment is used to illustrate how the terminal achieves the MDT measurement for time delay in the immediate minimization of drive test of the management based MDT.

Figure 3:
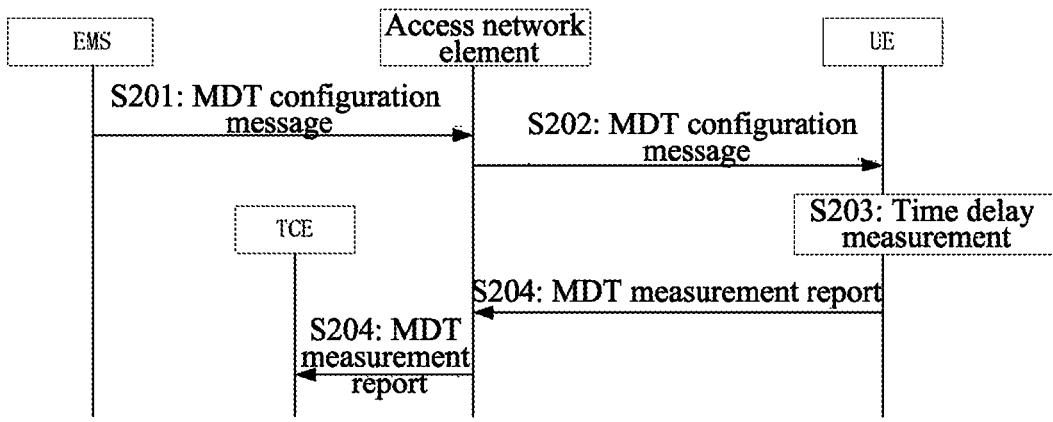
FIG. 3 is a flow chart of a second embodiment of the present document.

FIG. 3 is a flow chart in the case that the MDT function is a management-based MDT and in the working mode that the MDT function is in the immediate MDT. As shown in FIG. 3, the method may comprise the following processing steps:

step S201: the Network Management System (NMS) triggers a minimization of drive test, and sends a configuration request (the minimization of drive test configuration message) to the access network element such as the eNB or the RNC through the southbound interface; the message comprises the measurement requirement for acquiring the time delay information;

step S202: the access network element choose an appropriate terminal, and sends a MDT configuration message to the terminal; the present embodiment is the management based MDT, the eNB or RNC in the access network select one or more appropriate terminals; the access network sends the MDT configuration message to the terminal through the existing message, and the message comprises the measurement requirement for acquiring the time delay information;

The information message configured by the Node B for the terminal adopts the same message related to the radio resource management measurement, and particularly, in the E-UTRAN network, it may be a RRC connection reconfiguration message.

Step S203: after the terminal accepts the minimization of drive test configuration message, it starts to perform statistics on the number of packets whose transmission time exceeds the packet delay budget of the air interface and the total number of packets;

after the terminal accepts the MDT configuration, it identifies that it comprises the measurement requirement for acquiring the time delay; the terminal starts to perform statistics on the number of packets whose transmission time exceeds the packet delay budget of the air interface and the total number of packets;

if the configuration and measurement object is all the services of the terminal, the measurement object is all the services of the radio bearer of the terminal within the measurement time;

if the configuration and measurement object is a specific service of the terminal, for example, it is explicitly or by default to measure services, such as a certain QCI/E-RAB and so on, in the configuration, the measurement object is the service of the radio bearer corresponding to the QCI/E-RAB of the terminal within the measurement time;

In the following, examples are used for illustration:

if individually measuring a specific downlink QCI service, such as a voice service whose QCI is 1, the terminal acquires that the maximum end-to-end time delay of the QCI is 100 ms according to the related art, and according to this method, the terminal calculates that the packet delay budget of the air interface is 100 ms minus 20 ms, which is 80 ms, and the terminal performs statistics on the total number of packets that are sent from the Node B and successfully accepted by the terminal and the number of packets whose transmission time exceeds 80 ms, and the criteria for judging whether the packets are successfully accepted or not can be the same as the criteria in the related art, for example, it can be from the time that the first HARQ of the PDCP packet is transmitted to the time that the last HARQ transmission is successful or starting from the time that the previous one PDCP packet is accepted to the time that the last HARQ transmission of current PDCP packet is successful, neither of which will affect the accuracy of the result of the present document. For example, the total number of the counted packets can be 10,000, and the number of packets whose transmission time exceeds 80 milliseconds is 300.

If individually measuring a specific uplink QCI service, such as a TCP service whose QCI is 6, the terminal acquires that the maximum end-to-end time delay of the QCI is 300 ms according to the related art, and according to the present method, the terminal calculates that the packet delay budget of the air interface is 300 ms minus 20 ms, which is 280 ms, and the terminal performs statistics on the total number of packets which are sent from the terminal and successfully accepted by the Node B and the number of packets whose transmission time exceeds 80 milliseconds, and the criteria for judging whether the packets are successfully accepted or not can be the same as the criteria in the related art, for example, it can be starting from sending the PDCP packet and ending at the last HARQ transmission of the PDCP completed, neither of which will affect the accuracy of the result of the present document. For example, the total number of collected packets can be 10,000, and the number of packets whose transmission time exceeds 280 ms is 300.

According to the configuration, the terminal can simultaneously start the uplink and downlink measurements, or start only the uplink or downlink measurement.

Step S204: the terminal reports the measurement result to the TCE through the Node B.

the terminal reports to the node the number of packets whose transmission time exceeds the packet delay budget of the air interface and the total number of packets, or the ratio of the number of packets whose transmission time exceeds the packet delay budget of the air interface to the total number of packets, or the number of packets whose transmission time exceeds the packet delay budget of the air interface as well as the ratio of the number of packets whose transmission time exceeds the packet delay budget of the air interface to the total number of packets, for example, the total number of packets counted in the uplink is 10,000, the number of packets whose transmission time exceeds 80 milliseconds is 300, then the Node B reports (10000,300), 3%, or (10000,3%) to the TCE.

The terminal may choose to report according to its own measurement condition, or report after combining with other measurements, for example, after the terminal provides the location information, the terminal can combine and report its measured delay content and the location information of terminal, for example, reporting (10000,300, location information (latitude and longitude, and so on)) to the TCE.

The Node B provides to the TCE according to the report of terminal.

In other examples, it can be that the access network measures the time delay in the downlink while the terminal measures the time delay in the uplink, it can also be an extension of the abovementioned two embodiments.

Obviously, a person skilled in the art should understand that, each module or step in the present document can be implemented with a universal computing device, and they can be concentrated in a single computing device or distributed in a network composed of a plurality of computing devices, alternatively, they may be implemented with program codes executable by a computing device, so that they can be stored in a storing device and executed by a computing device, and in some cases, the steps shown or described herein can be processed in an order different from the one described herein, or they are made into integrated circuit modules respectively, or some of the modules or steps can be made into a single integrated circuit module for implementation. Thus, the present document is not limited to any specific combination of hardware and software.

The above description is only preferred embodiments of the present document and is not used to limit the present document, for a person skilled in the art, the present document may have various modifications and changes. Any modification, equivalent replacement, and improvement made within the spirit and principle of the present document should be included within the protection scope of the present document.

INDUSTRIAL APPLICABILITY

The embodiments of the present document can be used to improve the network performance and avoid the waste of network resources. The method in accordance with the embodiments of the present document can support the uplink and/or downlink measurements, so as to meet the actual needs of the MDT.

What is claimed is:

1. A minimization of drive test method for obtaining a time delay, comprising:
   receiving, by a node, a minimization of drive test (MDT) measurement and configuration parameter, wherein, the MDT measurement and configuration parameter carries a measurement requirement for obtaining a delay;
   performing, by the node, statistics on data information related to the total number of packets and the number of packets whose transmission time exceeds a packet delay budget (PDB) of an air interface within measurement time;
   wherein, the data information related to the total number of packets and the number of packets whose transmission time exceeds the packet delay budget of the air interface comprises:
   the total number of packets and the number of packets whose transmission time exceeds the packet delay budget of the air interface; or
   a ratio of the number of packets whose transmission time exceeds the packet delay budget of the air interface to the total number of packets; or
   the number of packets whose transmission time exceeds the packet delay budget of the air interface, as well as the ratio of the number of packets whose transmission time exceeds the packet delay budget of the air interface to the total number of packets.

2. The method of claim 1, wherein,
   after the node performs statistics on the data information, the method further comprises: reporting, by the node, the data information to a trace collection entity (TCE).

3. The method of claim 2, wherein, the node comprises an access network device and/or a terminal.

4. The method of claim 1, wherein,
   the node comprises an access network device and/or a terminal.

5. The method of claim 1, wherein,
   the packet delay budget of the air interface is a packet delay budget (PDB) of a Quality of Service Class Identifier (QCI) of a service under test minus x, wherein x is in a range of [0, 300] milliseconds.

6. The method of claim 5, wherein:
   the x is 20 milliseconds.

7. The method of claim 1, wherein,
   the measurement time comprises: a total transmission time of a radio bearer (RB), or part of the transmission time of the radio bearer.

8. A minimization of drive test device for obtaining a time delay, comprising a receiving module and a statistical module, wherein:

the receiving module is configured to receive a minimization of drive test (MDT) measurement and configuration parameter, wherein the MDT measurement and configuration parameter carries a measurement requirement for obtaining a delay;

the statistical module is configured to perform statistics on data information related to the total number of packets and the number of packets whose transmission time exceeds the packet delay budget of the air interface within measurement time;

wherein, the data information related to the total number of packets and the number of packets whose transmission time exceeds the packet delay budget of the air interface comprises:

the total number of packets and the number of packets whose transmission time exceeds the packet delay budget of the air interface; or a ratio of the number of packets whose transmission time exceeds the packet delay budget of the air interface to the total number of packets; or the number of packets whose transmission time exceeds the packet delay budget of the air interface, as well as the ratio of the number of packets whose transmission time exceeds the packet delay budget of the air interface to the total number of packets.

9. The device of claim 8, wherein,
the device further comprises a reporting module, which is configured to report the data information on which the statistical module performs statistics to a trace collection entity (TCE).

10. The device of claim 9, wherein, the device is an access network device and/or a terminal.

11. The device of claim 8, wherein,
the device is an access network device and/or a terminal.

12. The device of claim 8, wherein,
the packet delay budget of the air interface is a packet delay budget (PDB) of a Quality of Service Class Identifier (QCI) of a service under test minus x, wherein x is in a range of [0, 300] milliseconds.

13. The device of claim 12, wherein:
the x is 20 milliseconds.

14. The device of claim 8, wherein,
the measurement time comprises: a total transmission time of a radio bearer (RB), or part of the transmission time of the radio bearer.

* * * * *